(12) United States Patent
Fortmann (10) Patent No.: US 9,920,745 B2
(45) Date of Patent: Mar. 20, 2018

(54) WIND FARM WITH FAST LOCAL REACTIVE POWER CONTROL

(71) Applicant: Senvion SE, Hamburg (DE)

(72) Inventor: Jens Fortmann, Berlin (DE)

(73) Assignee: SENVION SE, Hamburg (DE)

( * ) Notice: Subject to any disclaimer, the term of this patent is extended or adjusted under 35 U.S.C. 154(b) by 392 days.

(21) Appl. No.: 14/397,441

(22) PCT Filed: Apr. 29, 2013

(86) PCT No.: PCT/EP2013/058920
§ 371 (c)(1),
(2) Date: Oct. 27, 2014

(87) PCT Pub. No.: WO2013/160486
PCT Pub. Date: Oct. 31, 2013

(65) Prior Publication Data
US 2015/0088326 A1    Mar. 26, 2015

Related U.S. Application Data

(60) Provisional application No. 61/639,379, filed on Apr. 27, 2012.

(51) Int. Cl.
  *F03D 7/04* (2006.01)
  *G05B 15/02* (2006.01)
  (Continued)

(52) U.S. Cl.
  CPC ............. *F03D 7/048* (2013.01); *F03D 7/043* (2013.01); *G05B 15/02* (2013.01);
  (Continued)

(58) Field of Classification Search
  CPC ........ F03D 7/048; F03D 7/028; F03D 7/0284; F03D 7/043; G05B 15/02; Y02E 40/32;
  (Continued)

(56) References Cited

U.S. PATENT DOCUMENTS

| | | | | |
|---|---|---|---|---|
| 2005/0012339 A1* | 1/2005 | Mikhail | ................ | F03D 7/0224 290/44 |
| 2009/0194995 A1* | 8/2009 | Delmerico | ............ | F03D 7/0284 290/44 |

(Continued)

OTHER PUBLICATIONS

Kunder, P. (1994). *Power System Stability and Control*. McGraw-Hill, Inc. New York, pp. 1-1176.

(Continued)

*Primary Examiner* — Nathan L Laughlin
(74) *Attorney, Agent, or Firm* — Morrison & Foerster LLP (57) ABSTRACT

Wind farm comprising a farm master and a plurality of wind energy installations. The farm master has a controller with an input for a control parameter for power supplied to a grid and transmits desired value specifications to a local controller of the wind energy installations. The local controller has a dual structure and comprises a desired value channel, to which the desired value specification is applied by the farm master and which is designed to output a stationary reactive power desired value, and a responsive channel comprising an autonomous controller, to which no desired value specification is applied by the farm master and to which an actual voltage of the particular wind energy installation is applied via a washout filter. The autonomous controller with the washout filter enables a fast and dependent response to transient disturbances (e.g., voltage spikes and voltage dips as a result of a short circuit).

14 Claims, 6 Drawing Sheets

(51) Int. Cl.
  *H02J 3/18*  (2006.01)
  *H02J 3/38*  (2006.01)

(52) U.S. Cl.
  CPC ....... *F05B 2270/337* (2013.01); *H02J 3/1885* (2013.01); *H02J 3/386* (2013.01); *Y02E 10/723* (2013.01); *Y02E 10/763* (2013.01); *Y02E 40/32* (2013.01)

(58) Field of Classification Search
  CPC .... Y02E 10/723; Y02E 10/763; H02J 3/1885; H02J 3/386; F05B 2270/337
  See application file for complete search history.

(56) References Cited

U.S. PATENT DOCUMENTS

| | | | |
|---|---|---|---|
| 2010/0109447 A1* | 5/2010 | Achilles | F03D 7/0284 307/153 |
| 2010/0314875 A1* | 12/2010 | Grant | F03D 7/0212 290/44 |

OTHER PUBLICATIONS

Machowski, J. et al. (2009). *Power System Dynamics Stability and Control*, Second Edition, John Wiley and Sons, pp. 1-629.

Behnke M. et al., "Development and Validation of WECC Variable Speed Wind Turbine Dynamic Models for Grid Integration Studies", *AWEA 2007 Wind Power Conference*, Jun. 4-7, 2007, Los Angeles, California; 8 pages.

E.ON Netz GmbH, Aug. 1, 2003, "Grid Code, High and Extra High Voltage", Bayreuth, Germany; 54 pages.

E.ON Netz GmbH, Apr. 1, 2006, "Grid Code, High and Extra High Voltage", Bayreuth, Germany; 46 pages.

"The Grid Code," Mar. 22, 2010, National Grid Electricity Transmission plc, 595 pages.

Technical Guideline, Jun. 2008, "Generating Plants Connected to the Medium-Voltage Network," BDEW Bundesverband der Energie—und Wasserwirtschaft e.V.; 130 pages.

TransmissionCode, Aug. 2007, "Network and System Rules of the German Transmission System Operators," Version 1.1. Verband der Netzbetreiber—VDN-e.V.beim VDEW; 79 pages.

* cited by examiner

WIND FARM WITH FAST LOCAL REACTIVE POWER CONTROL

REFERENCE TO RELATED APPLICATIONS

This application is a national stage application under 35 USC 371 of International Application No. PCT/EP2013/058920, filed Apr. 29, 2013, which claims the benefit of U.S. Provisional Application No. 61/639,379, filed Apr. 27, 2012, the entire contents of which are incorporated herein by reference.

FIELD OF THE INVENTION

The invention relates to a wind farm comprising a farm master and a plurality of wind turbines. In each case local control is provided in the wind turbines in order to implement setpoint values in respect of reactive power preset by the farm master.

BACKGROUND OF THE INVENTION

As a result of extensive expansion of wind turbines, their influence on the response on transmission grids is becoming ever greater. Therefore, it is increasingly expected of wind farms that they also contribute to ensuring the safety and stability of the transmission grid. This means that the wind farms need to feed not only active power, but also reactive power, if required. It is critical here that, in contrast to conventional power plants with their synchronous generators which are typically used, wind turbines use a different generator technology, namely generally a combination of asynchronous generator with partial or full converter or synchronous generator with full converter. The design with the converter provides the advantage that the reactive power component can be selected freely within certain limits. A disadvantage with this consists in that the intrinsic voltage stabilization, as results from conventional synchronous generators owing to their electrical characteristics, cannot be provided by the wind turbines provided with converters and the wind farms equipped with such wind turbines.

SUMMARY OF THE INVENTION

An object of the invention is to improve wind farms or wind turbines thereof in such a way that they have an improved response in respect of the reactive power feed, in particular in the case of grid disturbances.

A solution according to the invention lies in a wind farm or a wind turbine having the features as broadly disclosed herein. Advantageous developments can be found in the detailed embodiments described below.

In a wind farm comprising a farm master, a farm grid and a plurality of wind turbines connected thereby for feeding power to a grid in accordance with a control parameter, wherein the farm master has a controller comprising an input for the control parameter and an input for actual values for the fed power and an output, which outputs setpoint value presets to the wind turbines, wherein the wind turbines have a generator driven by a wind rotor and comprising a converter for generating electric power and outputting said electric power to the farm grid and a local controller for the setpoint value preset applied by the farm master, which local controller acts on the converter, provision is made in accordance with the invention for the local controller to have a double structure comprising a setpoint value channel, at which the setpoint value preset is applied by the farm master and which is designed to output a steady-state reactive power value, and a responsive channel, which comprises an autonomous controller at which no setpoint value preset is applied by the farm master and to which an actual voltage of the respective wind turbine is applied via a washout filter, and also an aggregator is provided, which combines the setpoint value channel and the responsive channel.

Some of the terms used will be explained below.

A control parameter is understood to mean a parameter determining the reactive power output of the wind farm. This may be in particular the preset of a reactive power Q to be output or a reactive current $i_Q$ to be output, or the preset of a phase angle $\varphi$ or of the corresponding power factor cos $\varphi$. However, it may also be a voltage preset, which is then correspondingly converted into a reactive power preset, for example via a voltage droop known per se.

A washout filter is understood to mean a filter which blocks steady-state signal components and allows transient signal components.

The invention is based on the concept that during regular operation with a stable grid, the farm master, by means of its controller, exerts dominant control over the wind turbines and the reactive power output thereof. Since during stable operation changes only occur slowly, a slow controller is therefore sufficient in the farm master; such a slow control is even advantageous since, owing to its immanent inertia, it counteracts the risk of control oscillations in interaction with the local controllers of the wind turbines. Furthermore, a slow controller avoids unnecessary controller actuations. A considerable practical advantage in this case further consists in that the communication in the often extensive wind farms is therefore not time-critical. The setpoint values therefore transmitted by the farm master to the wind turbines are so to speak those for the settled state ("steady state"). The wind turbine with its local controller adjusts to this state in a manner known per se.

A particular feature of the invention lies in that it additionally provides a controller comprising a washout filter for the local controller in the so-called responsive channel, wherein this controller is autonomous, i.e. the setpoint value is not applied to said controller by the farm master. The responsive channel can therefore respond purely to local changes, uninfluenced by the farm master. In accordance with the invention, it does this in the case of transient changes. Typical values are in the sub seconds range, wherein in practice implemented controls preferably have constants of at most 100 ms. Thanks to this responsive channel, the wind turbine does not need to wait for new, matched setpoint values from the farm master in the event of disruptions, but can respond completely autonomously to the disruption. In the case of transient disruptions occurring quickly, in particular in the case of voltage peaks, the responsive channel therefore exerts the dominant control of the wind turbine. Therefore, the wind turbine itself can control the voltage applied to it and therefore stabilize this voltage much faster. Undesired deviations, in particular as a result of voltage transients, can therefore not only be counteracted quickly, but also locally precisely at the points at which they occur.

An aspect of the invention lies in a shift in dominance, namely from the setpoint value channel during steady-state and quasi-steady-state operation to the responsive channel during dynamic, disrupted operation. The invention therefore resolves the apparent contradiction of firstly ensuring stability on the farm level as a result of rather slow control, and secondly the ability to respond quickly and effectively to disruptions in a remarkably simple and very effective manner. By way of summary, therefore, it can be stated that, with the invention, the controller in the farm master dominates in order to achieve steady-state accuracy, while the autonomous control which is only responsive to transients at the wind turbine dominates in order to deal with disruptions. Thanks to this concept of autonomy, the wind turbine can respond independently. This combination of local and fast control also makes it possible to mobilize local short-term reserves in order thus to be able to respond quickly and rigorously to disruptions. Such a local short-term reserve consists, for example, in the use of the overload withstand capability of the converter which is typically provided for short time periods and which makes it possible to transmit a higher current than the rated current for a short period of time of typically a few hundred milliseconds, and therefore to be able to output more reactive power. With central control at the farm master, even if it is so fast and elaborate, this would be impossible in practice taking into consideration the delay times owing to the farm-internal communication.

Preferably, the autonomous controller of the wind turbine is matched to the controller at the farm master in such a way that the autonomous controller is the fast controller and the controller at the farm master is the slow controller.

Important properties of the controller at the farm master and the autonomous control at the wind turbine can be summarized as follows:

The control at the farm master contributes to the control of the voltage on the grid and of the power flow. It is concerned with the fact that the desired reactive power is provided long term. The time constant preferably tends to be long in the region of typically 10 to 60 s. The farm master with its control is typically not intended to respond to fast changes in voltage, in particular even in order to avoid interactions with controllers of the wind turbines and therefore oscillations. The farm master, on the other hand, is intended to respond to changes in a control parameter externally. Therefore, the long-term reactive power reference is set at the farm master. This takes place as part of the long-term capabilities of the individual wind turbines. If the voltage is used as control parameter so that the wind farm as a whole operates in a voltage control mode, said wind farm should respond to slow changes in the voltages.

In contrast to this, the autonomous control of a wind turbine is primarily designed to control the voltage. It can respond quickly with the feed of high currents in particular in the event of short circuits. Preferred time constants for this are 20 to 30 ms for the local control. The local, autonomous control responds in dominant fashion to changes in the local voltage of a wind turbine. It responds quickly in order to stabilize the voltage range. The wind turbine or the wind farm as a whole has a similarly advantageous response to the grid in the event of voltage disturbances as do power plants with conventional synchronous generators.

In order to ensure that the responsive channel only responds to quick changes in voltage, as are typical in particular for voltage transients as a result of disruptions such as short circuits etc., the washout filter is provided. Therefore, slow changes in state of the voltage which are intended to fall within the control range of the farm master are kept away from the local control. The washout filter can have the design of a high-pass filter. It is particularly preferred if the washout filter has a submodule for determining a smoothed voltage profile. Thus, firstly a reliable measure of quick changes in voltage, as are known to be typical for disruptions, can be obtained by forming a difference between the smoothed voltage profile and the actual voltage profile. Secondly, a measure can therefore be provided in an elegant manner with the smoothed voltage profile which can be used for the (slow) setpoint value channel actuated by the farm master advantageously in the calculation of the values to be set in the relative long term (settled state).

The separation of the control for the settled state in the setpoint value channel and a quick response to disturbances in the responsive channel furthermore entails the advantage that the autonomous controller can be designed largely freely for the responsive channel. Typically, the grid connection criteria demand only a proportional response based on the settled state ("steady state"). Therefore, various types of control can be used for the autonomous controller in the responsive channel without being fixed to a proportional controller in the process. Expediently, a limiter is provided in the responsive channel, which limiter limits the output variable of the autonomous controller. This has the advantage that, firstly, even large gains can be used for the autonomous controller without an excessive response of the controller in the event of sudden considerable deviations. The limiter therefore combines a fast response with ensuring the stability by preventing excessively large actuating signals at the output of the autonomous controller.

Expediently, the submodule for determining the smoothed voltage profile is in the form of a memory, which outputs a steady-state value for the voltage of the wind turbine as smoothed voltage value. Such a memory for the voltage value according to the settled state, this stored value can advantageously be used for the setpoint value channel, for example for converting setpoint reactive power values from the farm master into currents to be set at the respective wind turbine. Preferably, the washout filter is formed from the submodule for determining a smoothed voltage profile and a differential element, with the output of the submodule being connected to one input of said differential element and an actual value for the respective voltage being connected to the other input thereof. Therefore, both a measure of the radio frequency disturbances, such as in particular voltage peaks, can be obtained in both an expedient and a simple manner for use in the responsive channel, but also a measure of the basic value in the settled state can be obtained for use at another location as well, for example in the setpoint value channel.

Preferably, the setpoint value channel has a dedicated controller, which is expediently parameterized corresponding to the autonomous controller. Surprisingly, it has been demonstrated that, thanks to the different configuration according to the invention of the setpoint value channel, on the one hand, and the responsive channel, on the other hand, with their different input variables, identical controllers with similar, if not even identical, parameters can be used. Nevertheless, the double structure according to the invention means that it is possible for the farm master to respond much faster to local disturbances as a result of voltage peaks than to changes in setpoint values. In consideration of the fundamentally different tasks performed by the two channels, this is surprising. This results in a considerable additional value in practice since the possibility is thus expediently provided of combining the controller in the setpoint value channel with the autonomous controller and consolidating them as one entity. This results firstly in a considerable simplification of the controller structure, and secondly fewer parameters would need to be set. It is to the merit of the invention that it has been identified that despite or else precisely because of the double structure according to the invention with the autonomous control in the responsive channel, identically parameterized controllers for the setpoint value and responsive channels can be used, which can even be combined with one another.

Preferably, an overload element is provided in the responsive channel. It is designed to permit increased power limits, at least for short periods of time, preferably by means of a timing element, with the result that it is possible to respond with greater severity to disturbances in the responsive channel. In this case, it is quite possible for the rated power provided for the continuous operation to be exceeded, wherein the peak power which is then set in the process can be considerably higher, but only for a very short period of time, and therefore prevents in particular thermal overload of the components, primarily of the converter. The same applies for the current loading, i.e. an increased peak current which is greater than the rated current is permitted for a short period of time.

In an expedient embodiment, the controller of the farm master is implemented with a voltage droop. A voltage droop defines the reactive power requirement as a function of a predetermined voltage deviation by the rated voltage, wherein, when a lower or upper limit voltage value is reached, in each case the maximum capacitive or inductive reactive power is fed. Expediently, such a voltage droop is connected upstream of the actual controller in the farm master. In the case of such an implementation, a situation is achieved whereby the voltage at the coupling point of the wind farm to the transmission grid, the so-called point of common coupling (PCC), only needs to be monitored by means of the voltage droop and compared with a setpoint value in order to generate from this, with the aid of said voltage droop, a setpoint value for the reactive power to be set by the farm master. Depending on the discrepancy of the actually fed reactive power, the farm master then outputs corresponding setpoint value presets to the individual wind turbines, wherein the setpoint value presets can be, for example, changes in reactive power, changes in phase angle or changes in voltage in the form of presets to the individual wind turbines. However, it is not the case that necessarily the voltage at the point of common coupling (PCC) is to be used as input variable for the farm master. Just as easily it is possible to provide that, instead, the reactive power fed at this point of common coupling or the phase angle prevailing there can be taken into consideration. Which parameter is used for this, i.e. acts as control parameter within the meaning of this invention, is ultimately a matter for the grid operator, and the grid operator will typically determine this in its grid code. A preferred embodiment for the controller in the farm master is a PI controller. This has the advantage that it can combine steady-stead accuracy with what tends to be a slow control response and therefore can ensure both steady-state accuracy and stability. The output signals calculated by the controller in the farm master are expediently distributed individually among the individual wind turbines of the farm.

The local control in the wind turbine can be implemented as reactive power control, as phase angle control or else as voltage control, depending on the type of setpoint value preset output by the farm master. It is essential that the local control has an autonomous responsive channel. Only then can the fast response to voltage disturbances desired by the invention take place. Therefore, a synchronous generator-like response in the case of grid voltage disturbances is provided for the wind turbines and the wind farm as a whole.

The invention further extends to a method for operating a wind farm comprising wind turbines in accordance with that which has been described above.

BRIEF DESCRIPTION OF THE DRAWINGS

The invention will be explained in more detail below with reference to the attached drawing and illustrated in the advantageous exemplary embodiments. In the drawing:

FIGS. 2a and b show different alternative illustrations of a block diagram of a farm controller;

FIGS. 3a and b show two exemplary embodiments of local controllers at wind turbines for the wind farm in accordance with the exemplary embodiment;

FIGS. 5a and b show a combined block illustration of the farm controller and the local controller of the wind turbine in accordance with a preferred exemplary embodiment and an alternative embodiment of the invention;

DETAILED DESCRIPTION OF THE INVENTION

Figure 1:
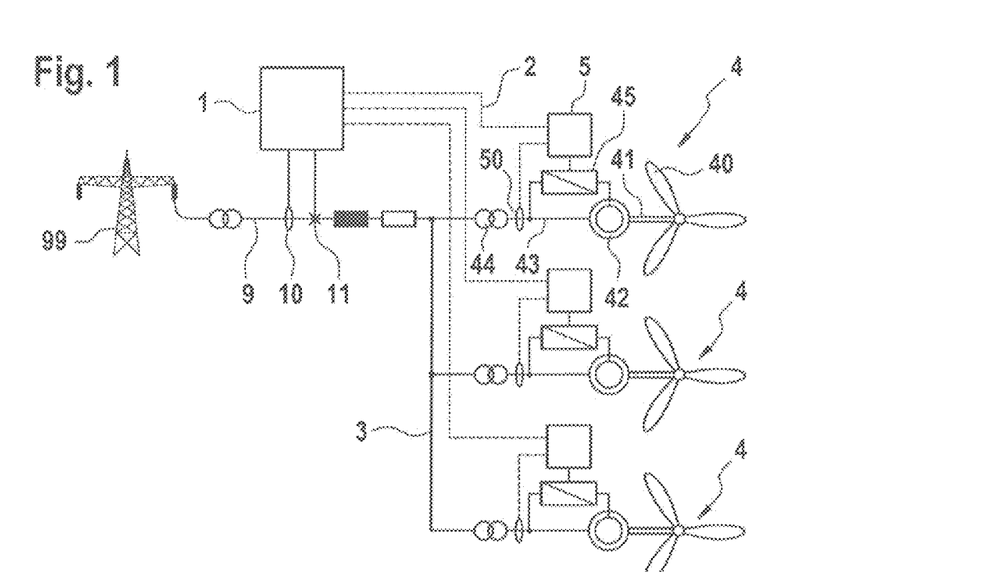
FIG. 1 shows a schematic view of a wind farm in accordance with one exemplary embodiment of the invention.

A wind farm in accordance with one exemplary embodiment of the invention comprises a farm master 1 and a plurality of wind turbines 4, which are connected via a communications network 2, and wherein, in addition, a farm-internal grid 3 is provided, which combines the electric power generated by the wind turbines 4 and outputs this electric power to a connected energy transmission grid 99 via a point of common coupling 9. The wind turbines each comprise a wind rotor 40, which is connected to a generator 42 via a rotor shaft 41 and drives said generator. In the exemplary embodiment illustrated, the generator 42 is in the form of a double-fed asynchronous generator comprising a stator and a rotor. A turbine transformer 44 is connected directly to the stator via a connection line 43, via which turbine transformer the wind turbine 4 outputs the electric power generated thereby to the farm grid 3. One end of a converter 45 is connected to the rotor of the generator 42, the other end of said converter being connected to the connecting line 43. The electrical energy produced in the rotor is passed through the converter 45. In addition, a local controller 5 of the wind turbine 4 is connected to the converter 45.

The local controller 5 of the wind turbine 4 is connected to the farm master 1 via the communications network 2 and receives setpoint values from said farm master. In addition, measurement sensors 50 for electrical parameters at the wind turbine 4 are connected to the local controller 5, for example a voltage sensor in the exemplary embodiment illustrated. The local controller 5 is designed to control the wind turbine 4 during operation thereof. For this purpose, it receives setpoint values from the farm master 1 via the communications network 2. In addition, it monitors certain electrical parameters, in this case the voltage, by means of dedicated sensors in the form of the voltage sensor 50.

The farm master 1 is designed to control the wind turbines 4 in the wind farm centrally. It outputs in each case individually presets in respect of the operational response of the wind turbines 4 to said wind turbines via the communications network 2. The farm master 1 in turn receives presets from the operator of the grid 99. As an alternative or in addition, the farm master 1 has voltage and current sensors 10, 11 at the point of common coupling 9 to the grid and can therefore monitor both the grid voltage and if desired also the output active or reactive power.

Figure 2:
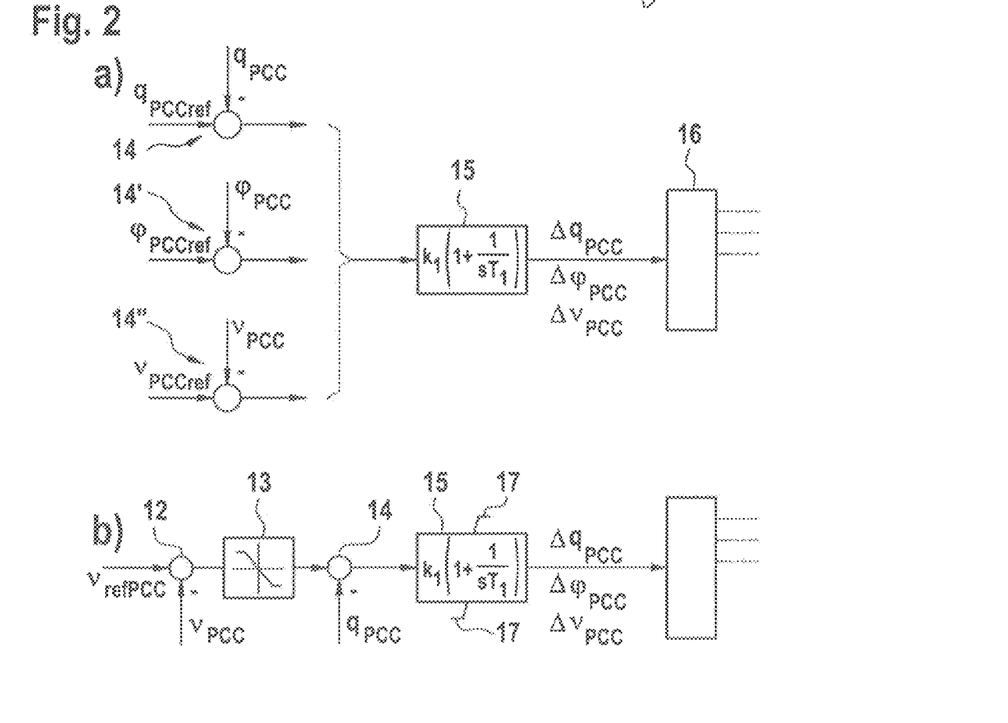

The design of the farm master 5 is illustrated as a block diagram in FIG. 2. The farm master 1 has an input stage 14, in which a reference value preset by the operator of the transmission grid 99 is applied and compared with a corresponding actual value determined by the sensors 10, 11. In this case, the output reactive power q can be provided at the input stage 14 as reference, for the phase angle φ at the input stage 14' or for the output voltage v at the input stage 14". The input stage forms a difference from the reference value and from the actual value and outputs this to an input of a controller core 15, which, in the exemplary embodiment illustrated, is in the form of a proportional-integral controller (PI controller). Which of the input variables reactive power q, phase angle φ or voltage at the point of common coupling v is used is dependent on the presets of the operator of the transmission grid 99. Corresponding output signals in relation to the correction of the reactive power to be set $\Delta q_{PCC}$, $\Delta \varphi_{PPC}$ and $\Delta v_{PPC}$, respectively, are generated by means of the controller core 15 and output to the farm-internal communications network 2 via a distribution module 16 and via said communications network to the individual wind turbines 4. Such a basic structure of the farm controller is illustrated in FIG. 2a.

In addition, a special form may be provided for the farm controller, as is illustrated in FIG. 2b. In this case, a prefilter is connected upstream of the actual controller core 15 with its input stage 14 and consists of a voltage droop 13 and a differential element 12 for determining a fault voltage at the point of common coupling 9. The actually present, measured voltage $v_{PPC}$ at the point of common coupling 9 is applied to the differential element 12 and is compared with a preset reference value for the voltage $v_{refPCC}$. The difference resulting from this, i.e. therefore a voltage fault at the point of common coupling 9, is applied as input signal to the voltage droop 13. A characteristic is implemented in the voltage droop 13 which outputs in each case a reactive power preset depending on the voltage deviation. This takes place in the exemplary embodiment illustrated in such a way that, in the event of a voltage deviation of zero, no reactive power is intended to be stipulated, i.e. the output value is zero. However, in the event of a downward voltage deviation, i.e. in the event of an undervoltage, an increasing amount of reactive power is intended to be output until finally, at a limit value $v_{min}$, the highest possible reactive power output $q_{max}$ is reached. Conversely, in the event of a voltage deviation towards the positive, i.e. in the event of an overvoltage, negative reactive power is intended to be output, wherein the greatest possible negative reactive power $q_{min}$ is intended to be reached and maintained when a maximum voltage $v_{max}$ is reached. The corresponding preset values for the reactive power, which are between $q_{min}$ and $q_{max}$ after the voltage droop 13, form the reference value for the input stage 14. There, the comparison with the actually output reactive power $q_{PPC}$ at the point of common coupling 9 takes place, as described above already in connection with FIG. 2a.

The controller 15 of the farm master 1 is designed to respond to changes in the loading situation in the transmission grid 99 and, in particular when using the voltage droop 13, to changes in voltage. It does this in such a way that it changes the setpoint values for the reactive power to be output by the wind farm. The controller 15 is parameterized in such a way that its time constant is within the range of approximately 10 to 60 s. Therefore, the farm master 1 is able to respond to corresponding external presets in respect of reactive power or voltage and to output long-term reactive power reference values to the individual wind turbines at its output via the communications network 2. The controller 15 preferably has a limitation 17. This ensures that the continuous loadability of the wind turbines 4 is not exceeded by excessively high reactive power presets. The long time constant of the controller core 15 ensures that it is possible to respond correspondingly to slow changes in voltage resulting from changes in load. Correspondingly, the farm master 1 outputs corrected values for the setting of the operating point to the wind turbines 4. It should be noted that, owing to limited transmission speed via the communications network 2, this can only take place with a certain time delay. Since the controller 15 in the farm master 1 is in any case operated at a large time constant in the range of 10 to 60 s, however, the limitation of the transmission speed via the communications network 2 does not have any disadvantageous effects.

Figure 3:
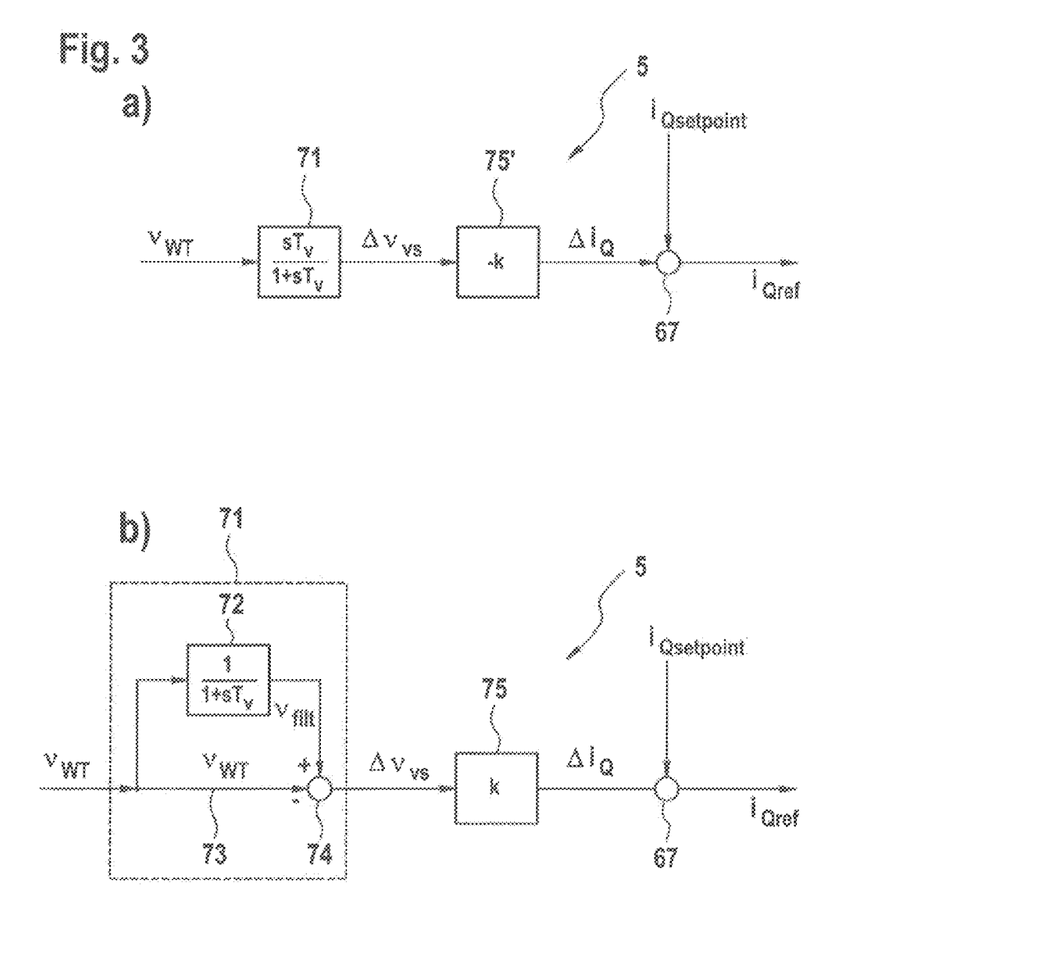

A core structure for the local controller 5 of the wind turbine 4 is illustrated in FIG. 3a. The controller 5 outputs a signal for a reactive current $i_{Qref}$ at its output, which reactive current is to be set by the converter 45. This reactive current to be set is formed from the sum of a steady-state component and a dynamic component. The steady-state component $i_{Qsetpoint}$ in this case represents the setpoint value, as preset by the farm master 1. The dynamic component is formed by a differential current $\Delta i_Q$, which is dependent on changes in voltage at the wind turbine 4. By virtue of the use of a so-called washout filter 71, it is possible to ensure that, of the values measured by the voltage sensor 50 for the voltage at the wind turbine $v_{WT}$, only voltage changes $\Delta v_{vs}$ are passed on, and no steady-state state changes in the voltage at the wind turbine are transmitted. This voltage deviation is applied to a proportional control element 75' with a gain −k. This describes the relationship between a change in the reactive current as a consequence of a change in voltage. It should be mentioned that such a proportional element 75' is not absolutely required, but any desired structure which has a proportional response from a steady-state point of view per se is sufficient. The value $\Delta i_Q$ output by the proportional element 75' is added to the steady-state component as dynamic component, as described above.

An embodiment of the washout filter 71 which is particularly suitable for practical implementation is illustrated in FIG. 3b. According to this figure, the washout filter 71 is formed by the parallel circuit of a low-pass filter 72 with a direct link 73 and a differential element 74, wherein the output of the low-pass filter 72 with a positive mathematical sign and the direct link 73 with a negative mathematical sign is applied. The low-pass filter 72 generates a smoothed voltage $v_{filt}$ from the voltage $v_{WT}$ measured by the voltage sensor 50 at the wind turbine 4. If the present measured value $v_{WT}$ is subtracted from this, steady-state changes in the voltage are canceled in the process. After the differential element 74 then only rapid dynamic changes in voltage $\Delta v_{VS}$ remain. Therefore, the desired focusing on the voltage changes can be achieved in a simple and efficient manner.

Figure 4:
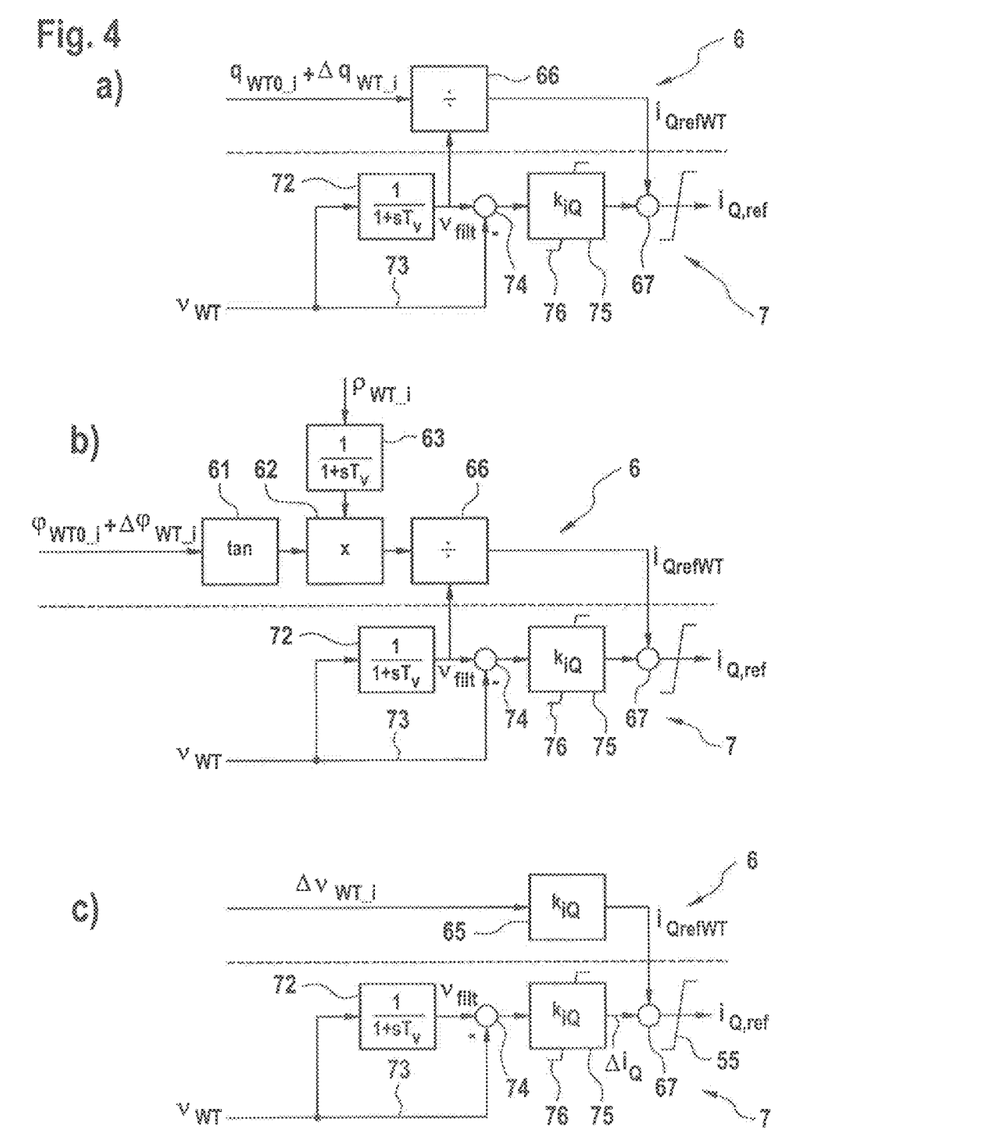
FIGS. 4a-c show various embodiments of the local controller of the wind turbine.

Three examples of practically implemented local controllers 5 for the wind turbines 4 are illustrated in FIG. 4. FIG. 4a shows a controller 5 in which the reactive power q acts as reference variable. It comprises a setpoint value channel 6 for the steady-state component and a responsive channel 7, which is based on the core structure concept illustrated in FIG. 3b, for the dynamic component. For the steady-state component, the signal output by the farm master 1 acts as basic signal for the reactive power $\Delta q_{WT\_i}$ (the index i in this case describes the i-th wind turbine of the wind farm); a value $q_{WT0\_i}$, which represents a signal for the steady-state setting point of the reactive power for the respective wind turbine, is added to this value. The reactive current to be set for achieving these setpoint values is calculated by means of a division element 66 from the reference value for the reactive power divided by a smoothed value for the voltage at the wind turbine, wherein the smoothed value is taken from the dynamic component by the low-pass filter 72 of the washout filter 71. The use of the smoothed value from the low-pass filter 72 provides the advantage that this filtering prevents the slower steady-state control by the farm master 1 counteracting the fast voltage control in accordance with the dynamic component. The output values of the setpoint value channel 6 and the responsive channel 7 are applied to a summation element 67, which, as aggregator, adds the two values.

A second alternative embodiment is illustrated in FIG. 4b. It likewise comprises a setpoint value channel 6 and a responsive channel 7, whose values are combined with one another via a summation element 67 as aggregator. In this case, in turn a signal is applied as reference value for the setpoint value channel 6 by the farm master 1, to be precise in this embodiment a reference value for the phase angle $\Delta\varphi_{WT\_i}$ to be set for each wind turbine. A value $\varphi_{WT0\_i}$, which represents a signal for the steady-state setting value of the phase angle of the respective wind turbine 4 (generally a phase angle of zero here, i.e. $\varphi_{WT0\_i}=0$), is added to this setpoint value. Finally, a reactive power reference is calculated from the tangent 61 of the phase angle φ by multiplication 62 by a value for the active power $p_{WT\_i}$ of the wind turbine. The active power $p_{WT\_i}$ output by the wind turbine is in this case not used directly, but first supplied to a low-pass filter 63 in order thus to produce a stable value and to counteract the risk of counteraction for fast voltage control in accordance with the responsive channel 7. The value thus determined for the reactive power reference is then further-processed by means of the division element 66, as explained above in relation to FIG. 4a.

A further alternative embodiment is illustrated in FIG. 4c, wherein a reference voltage is used as the parameter for the setpoint value channel 6. In this case, a value for a change in voltage $\Delta v_{WT\_i}$ is output to the respective wind turbine by the farm master 1. It is assumed that no reactive current is necessary when setting to the rated voltage. The voltage change signal $\Delta v_{WT\_i}$ is applied to a proportional element 65, which has a gain of $k_{iQ}$ and describes the gain of the local reactive current response to a change in the voltage change reference. The output value of the proportional element 65 is a setpoint current $i_{QrefWT}$ as output value of the setpoint value channel 6. As is also the case in the embodiments shown in FIGS. 4a and 4b, the output value of the responsive channel 7 is added to this value at the summation element 67.

Mention is further made of the fact that in all embodiments 4a, 4b and 4c, limitation 55 of the reference value for the reactive current which is output by the local controller 5 to the converter 45 takes place preferably after the summation element 67, to be precise both in relation to a minimum to be maintained and a maximum to be maintained. Hereby, fast, autonomous control is provided for the local controller.

It is autonomous in the sense that the responsive channel 7 does not receive a setpoint value from the farm master 1. The responsive channel 7 can therefore respond independently and quickly to changes in voltage without setpoint values needing to be determined first by the farm master 1 for this purpose and needing to be distributed over the communications network 2. The controller can therefore respond very quickly to changes, and in particular in the case of a short circuit respond with corresponding feeding of reactive current. For this purpose, the autonomous controller in the responsive channel 7 is preferably parameterized with a short time constant, expediently within the range of 20 to 30 ms. It is thus capable of responding to dips owing to fast changes in voltage. The local controller 5 therefore has the capability, with its responsive channel 7, to be able to respond quickly and to be able to feed reactive current directly to the individual wind turbine 4. In order to be able to effect an even stronger response, limiters 76 are preferably provided at the controller core 75 of the responsive channel 7, which limiters have increased limit values using short-term overload reserves of the converter 45. Therefore, not only a quicker but also a hard response to changes in voltage, as can result from short circuits or load shedding, is ensured. Owing to the extended limit values, an overload module 76 is thus provided.

Figure 5:
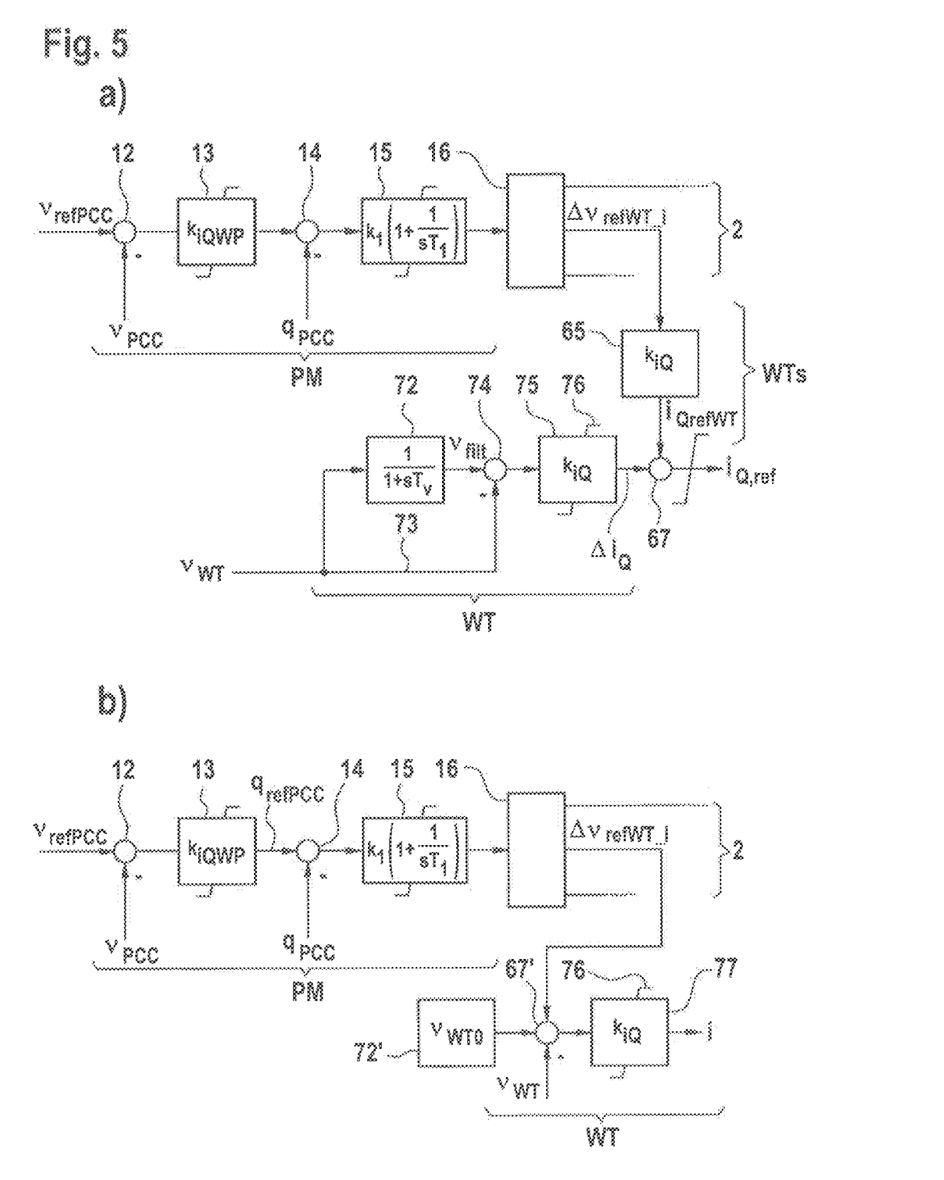

A combination of the local controller 5 and of the farm master 1 using the voltage droop 13 is illustrated in FIG. 5a. The top region of the figure which is annotated "PM" depicts the controller of the farm master 1 with the voltage droop. The region at the bottom provided with the designation "WT" illustrates the local controller 5 with its responsive channel 7 and the region at the side denoted by the designation "WTs" illustrates the setpoint value channel 6 of the local controller 5. A reference value for the reactive power to be output is formed, by means of the voltage droop 13, from the reference voltage and the actual voltage at the point of common coupling 9 and compared with a value for the reactive power actually output by the wind farm at the differential point 14. The controller core 15 of the farm master 1 determines from this voltage reference signals for the wind turbines 4, wherein an individual signal $\Delta v_{refWT\_i}$ is generated for each of the wind turbines 4 and is distributed via a distribution device 16 and the farm-internal communications network 2.

In accordance with a particularly advantageous embodiment a shift of the aggregator is provided in FIG. 5b, to be precise in such a way that it is now in the form of a summation element 67' shifted to the input of the controller, wherein the controller is now a combined controller 77, in which the autonomous controller 75 and the controller 65 of the setpoint value channel 6 are combined with one another. In this case, the invention makes use of the fact that the signal transmitted via the communications network 2 by the farm master 1 to the individual wind turbine 4 is likewise a voltage signal, which is also used in the autonomous controller of the responsive channel 7. Therefore, it can be applied easily to the summation element 67'. Furthermore, a "virtual high-pass filter" is formed in place of the washout filter 71. It comprises a memory 72' and the shifted summation element 67'. The memory 72' stores the steady-state setting value of the voltage $v_{WT0}$ at the wind turbine 4 and applies it to an input of the shifted summation element 67', wherein the voltage $v_{WT}$ measured by the voltage sensor 50 is applied to the other input of said summation element. The invention has identified that, for practical applications, the use of this setting value and storing said setting value can act as equivalent variable for the filtered voltage value $v_{filt}$, as has been generated by the low-pass filter 72. Therefore, the low-pass filter 72 can be dispensed with. This simplified structure is illustrated in FIG. 5b. By virtue of a comparison with the functionally equivalent structure in FIG. 5a, the simplification can clearly be seen. Mention is also made of the fact that the value of $v_{WT0}$ can either be selected as a fixed value for all of the wind turbines 4 of the wind farm or as a value which is optimized individually for each wind turbine.

Figure 6:
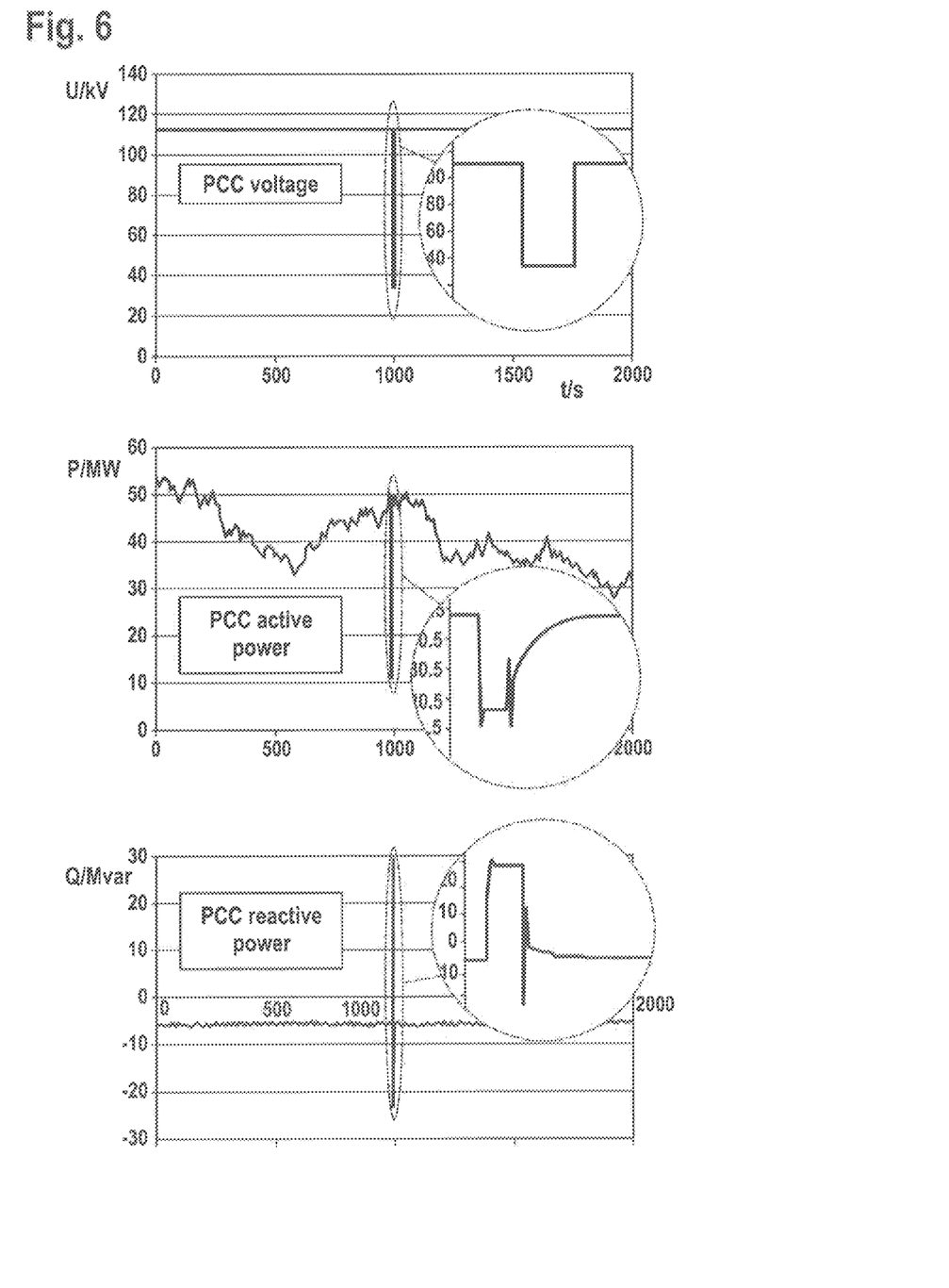
FIG. 6 shows graphs illustrating the response of the wind farm in the case of a grid fault.
Figure 7:
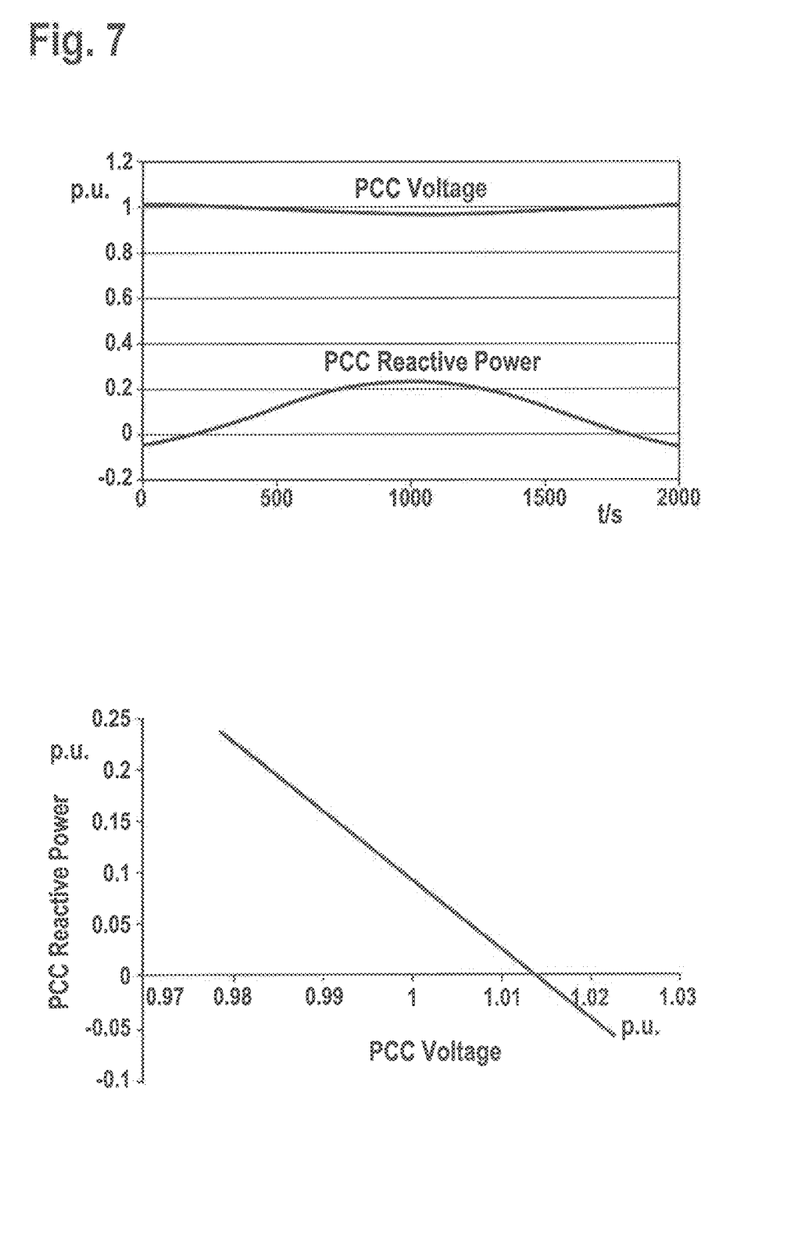
FIG. 7 shows graphs comparing voltage and reactive power.

The application of the invention to a wind farm on a 110 kV transmission grid 9 is illustrated in FIGS. 6 and 7. At time t=1000 s, a grid disturbance occurs in the form of a short-circuit-like voltage dip. This lasts over a time period of 300 ms. This is illustrated in the graph at the top in FIG. 6. Owing to the voltage dip, the fed active power is reduced correspondingly owing to the relationship P=U×I, as can be seen from the graph in the center in FIG. 6. The local controller 5 of the wind turbine 4 therefore responds to this change by the responsive channel 7 responding to the change in voltage and, correspondingly, increasing the output of reactive power very quickly (see the graph at the bottom in FIG. 6). Once the fault has been cleared, both the voltage and the temporarily very increased reactive power feed return to their original values again.

A second simulation of the response of the wind farm according to the invention in the event of a slow change in voltage is illustrated in FIG. 7. As provided, the steady-state voltage control at farm level ensures that there is a linear relationship between the voltage and the reactive power at the point of common coupling 9.

The invention claimed is:

1. A wind farm comprising a farm master, a farm grid, and a plurality of wind turbines for feeding power to the farm grid in accordance with a control parameter, wherein the farm master has a controller comprising an input for the control parameter, an input for the actual value for the fed power, and an output unit configured to output setpoint value presets to the wind turbines,
wherein each wind turbine comprises:
a generator driven by a wind rotor,
a converter for generating electrical energy and outputting the energy to the farm grid, and
a local controller for the setpoint value preset applied by the farm master, wherein the local controller has a double channel structure and comprises:
a setpoint value channel at which the setpoint value preset is applied by the farm master and which is configured to output a steady-state setpoint reactive power value,
a responsive channel, which comprises an autonomous controller at which no setpoint value preset is applied by the farm master and to which an actual voltage of the respective wind turbine is applied via a washout filter, and
an aggregator for the setpoint value channel and the responsive channel for output to the converter.

2. The wind farm of claim 1, comprising a submodule for the washout filter for determining a smoothed voltage profile.

3. The wind farm of claim 1, wherein the responsive channel has an overload module configured to provide increased limit values for an output variable of the local controller at least for a limited time.

4. The wind farm of claim 1, wherein the washout filter comprises a submodule for determining a smoothed voltage profile and the submodule is connected to a first input of a differential element, the differential element having a second input to which the actual voltage of the respective wind turbine is connected.

5. The wind farm of claim 4, wherein the submodule comprises a low-pass filter.

6. The wind farm of claim 1, wherein the setpoint value channel has a dedicated controller.

7. The wind farm of claim 6, wherein the dedicated controller and the autonomous controller are in the form of a combined controller.

8. The wind farm of claim 1, wherein the washout filter comprises a memory, configured to output a steady-state voltage value which is smooth for the voltage of the wind turbine.

9. The wind farm of claim 1, wherein the autonomous controller of the wind turbine is configured relative to the controller at the farm master such that the autonomous controller has a shorter response time than the controller at the farm master.

10. A wind turbine comprising:
a generator driven by a wind rotor,
a converter for generating electric power and outputting the electric power to a grid, and
a local controller which acts on the converter and has an input for an externally applied setpoint value preset, wherein the local controller has a double channel structure and comprises:
a setpoint value channel at which the input for the setpoint value preset is applied and which is configured to output a steady-state setpoint reactive power value,
a responsive channel, which comprises an autonomous controller which does not have an input for an external setpoint value preset and to which an actual voltage of the wind turbine is applied via a washout filter, and
an aggregator for the setpoint value channel and the responsive channel.

11. The wind turbine of claim 10, comprising a submodule for the washout filter for determining a smoothed voltage profile.

12. A method for operating a wind farm comprising a farm master, a farm grid, and a plurality of wind turbines for feeding power into the grid in accordance with a control parameter, wherein the farm master has a controller comprising an input for the control parameter and an input for actual values for the fed power, and an output unit, and the wind turbine has a generator driven by a wind rotor and comprises a converter and a local controller, wherein setpoint value presets are output to the wind turbines by the controller in the farm master, which wind turbines generate electrical energy on the basis of the applied setpoint value presets and output this electrical energy to the farm grid, the method comprising:
implementing double processing in the local controller, wherein the setpoint value preset is processed by the farm master via a setpoint value channel, and a steady-state setpoint reactive power value is output,
performing autonomous control via a responsive channel independently of the setpoint value preset by the farm master such that an actual voltage of the respective wind turbine which is filtered by a washout filter is used as input signal, and
aggregating and outputting to the converter output signals from the setpoint value channel and the responsive channel.

13. The method of claim 12, wherein a submodule for the washout filter determines a smoothed voltage profile.

14. The wind farm of claim 6, wherein the dedicated controller is parameterized corresponding to the autonomous controller.

* * * * *